US007140518B2

(12) United States Patent
Wang

(10) Patent No.: US 7,140,518 B2
(45) Date of Patent: Nov. 28, 2006

(54) ATOMIZER

(76) Inventor: Chi-Hsiang Wang, 12F-6, No. 16, Jian Ba Rd., Chung Ho, Taipei Hsieng (TW) 235

( * ) Notice: Subject to any disclaimer, the term of this patent is extended or adjusted under 35 U.S.C. 154(b) by 0 days.

(21) Appl. No.: 10/905,218

(22) Filed: Dec. 21, 2004

(65) Prior Publication Data

US 2005/0145722 A1 Jul. 7, 2005

(30) Foreign Application Priority Data

Dec. 22, 2003 (TW) .............................. 92222407 U
Dec. 29, 2003 (CN) ........................ 2003 2 0131747

(51) Int. Cl.
*G01F 11/00* (2006.01)

(52) U.S. Cl. ...................... 222/390; 222/105; 222/325; 222/326; 222/386

(58) Field of Classification Search ................ 222/105, 222/321.7, 321.9, 325, 326, 327, 386, 390
See application file for complete search history.

(56) References Cited

U.S. PATENT DOCUMENTS 3,815,787 A * 6/1974 Spies .......................... 222/95
4,223,808 A * 9/1980 Williams et al. .............. 222/88
5,143,259 A * 9/1992 Williams ...................... 222/80
5,186,361 A * 2/1993 Williams ...................... 222/95
5,238,150 A * 8/1993 Williams ...................... 222/95
5,282,549 A * 2/1994 Scholz et al. ................. 222/95
5,353,962 A * 10/1994 Scholz et al. ................ 222/95

* cited by examiner

*Primary Examiner*—Justine R. Yu
*Assistant Examiner*—Jason Boeckmann
(74) *Attorney, Agent, or Firm*—Law Offices of K.W. Wang; Karry W. Wang, Esq

(57) ABSTRACT

An atomizer that includes a tubular sheath having at least two tooth-edged slits, a compressible and expandable reservoir preferably made of accordion-like pleats and placed inside the tubular sheath allowing only a neck portion with an opening to extend outside of the top opening of the tubular sheath, an outer shell having at least one helical groove on its inner wall, a engageable with the tubular sheath and the tubular shell via the at least two slits and the at least one helical groove, respectively, and an actuator. As the actuator is rotated, it rotates the tubular sheath. The pressurizer is rotated upward along the helical groove or grooves and the tooth-edged slits, and compresses the reservoir. A dispensing nozzle capping the reservoir dispenses the content of the reservoir when pressed.

10 Claims, 4 Drawing Sheets

ATOMIZER

CROSS-REFERENCE TO RELATED APPLICATIONS

This application claims the benefit of both Application No. 092222407 filed in Taiwan on Dec. 22, 2003, and Application No. 200320131747.8 filed in China on Dec. 29, 2003.

FIELD OF THE INVENTION

The present invention relates generally to liquid spray devices and, more particularly, to an atomizer having a refillable reservoir and is capable of being used in upright, horizontal and upside-down orientations.

BACKGROUND OF THE INVENTION

In general, liquid spray devices or atomizers can be categorized into two types: pneumatic and manual pump. Pneumatic atomizers utilize a pressurized carrier gas to disperse a flowable liquid as small aerosolized particles, and are commonly used in cosmetics and pharmaceuticals. Examples of pneumatic atomizers include dispensers of fragrances, antiperspirants, and insecticides.

The advantage of using a pneumatic atomizer is that it can be made portable, often small enough to be carried in a pocket or purse. However, pneumatic atomizers are usually not refillable, costly to make, and can cost environmental problems if not disposed properly.

On the other hand, a manual pump type of atomizer dispenses liquid from its reservoir when the dispensing head or handle of the pump is pressed, sometimes repeatedly, to force the liquid content from the reservoir into a capillary tube and out of the dispensing orifice in either a mist or liquid form. This type of atomizer is typically made larger in size than the pneumatic type. Examples include dispensers of cleaning solutions, bath or shower gels, and moisturizing lotions.

Although the content of a manual-pump atomizer can sometimes be refilled, a problem often arises when the content volume is low and the atomizer is operated in a horizontal orientation or at an angle to the upright orientation. When the capillary conduit cannot reach the liquid content, the content cannot be dispensed. As such, it is almost impossible to dispense the content of a manual-pump atomizer in an upside-down orientation.

SUMMARY OF THE INVENTION

The present invention discloses an improved atomizer that is inexpensive to manufacture, easy to assemble, refillable, and can be operated upright, horizontally, or upside down.

An atomizer in accordance with the present invention includes a tubular sheath, a compressible and expandable reservoir, a pressurizer, a tubular shell, and an actuator. Preferably, the tubular sheath has at last two slits with toothed edges extending in the direction of the sides of the tubular sheath. The compressible and expandable reservoir is preferably tubular and made of accordion-like pleats. When inserted into the tubular sheath, the top opening of the reservoir extends out of the top opening of the tubular sheath and engages with a dispensing cap having a dispensing head and orifice. The pressurizer includes at least two protruding elements each having two teeth for engaging the toothed slits of the tubular sheath, and a ridged surface portion. The tubular shell has at least one helical groove carved on its inner wall engageable with the ridged surface portion of each of the protruding elements. The actuator is preferably in the form of a rotatable cap that houses the bottom portion of the pressurizer and interlocks with the tubular sheath such that the pressurizer is inside the sheath engaging the bottom of the reservoir.

As the actuator is rotated, the tubular sheath rotates accordingly. The pressurizer rotates upward along the helical groove on the tubular shell's inner wall while the protruding elements move up in the toothed slits, pressing against the bottom of the reservoir and increasing the pressure inside the reservoir. When the dispensing head is pressed, the pressure inside the reservoir forces the liquid to burst out of the dispensing orifice.

BRIEF DESCRIPTION OF THE DRAWINGS

The foregoing and other objects, aspects and advantages will be better understood from the following description of one embodiment in accordance with the present invention with reference to the accompanying drawings, in which like numerals reference like elements, and wherein.

DETAILED DESCRIPTION OF THE INVENTION

Figure 1:
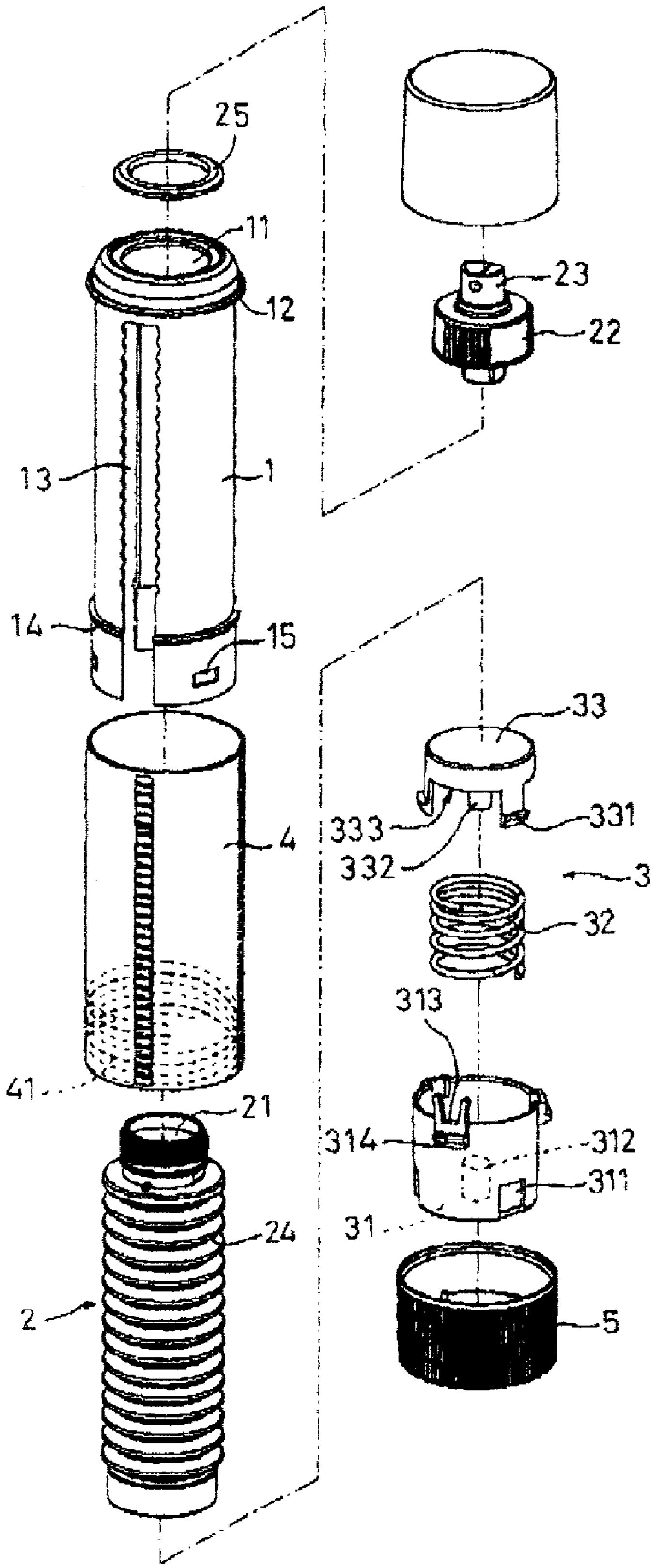
FIG. 1 is an exploded view of an atomizer in accordance with the present invention.
Figure 2:
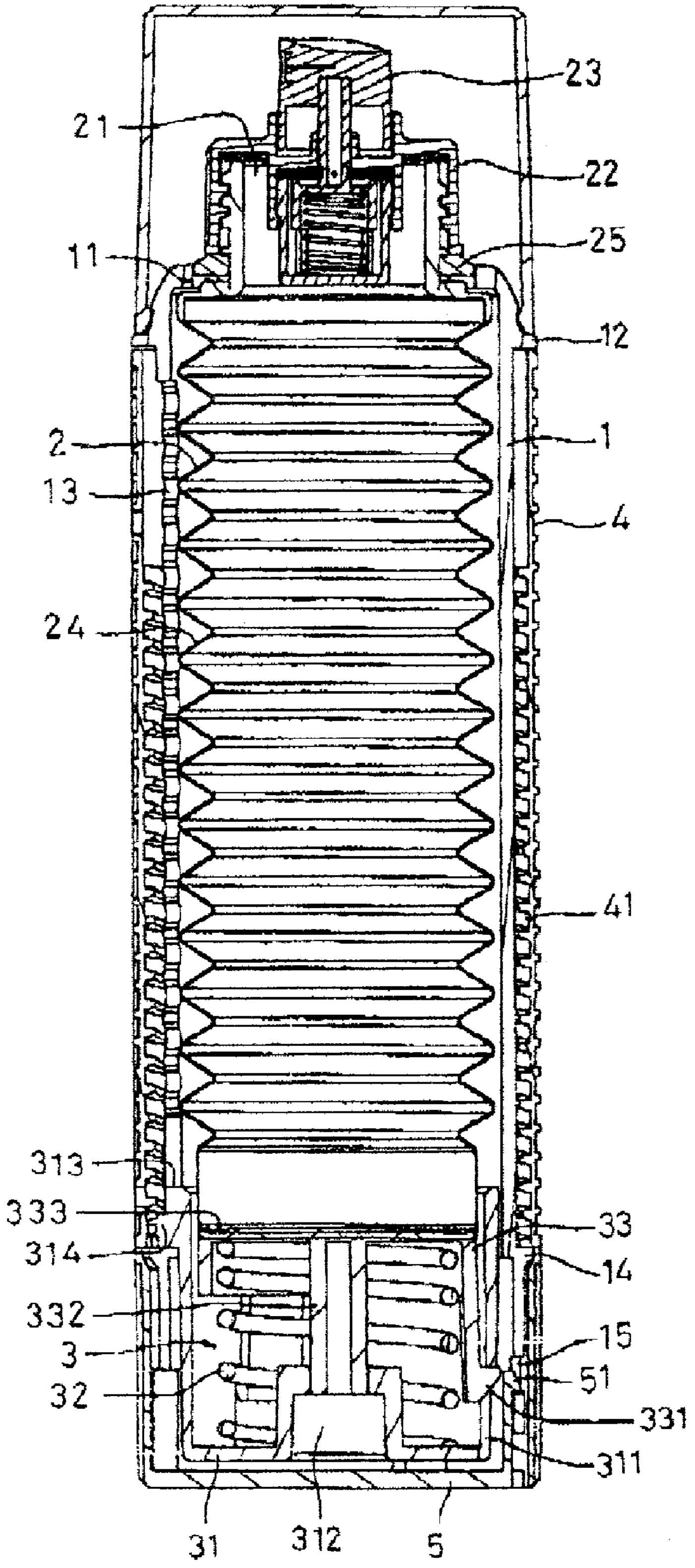
FIG. 2 is a cross-sectional view of the atomizer of FIG. 1.

Turning first to FIGS. 1 and 2, an atomizer in accordance with the present invention preferably includes a tubular sheath 1, a compressible and expandable reservoir 2, a pressurizer 3, a tubular shell 4, and an actuator 5.

Tubular sheath 1 covers over the compressible and expandable reservoir 2, allowing only a reservoir opening portion 21 to extend out of a sheath opening 11 while keeping the rest of reservoir 2 inside its hollow interior. Preferably, tubular sheath 1 also includes a first ring 12 and a second ring 14 protruding from the outer surface of tubular sheath 1 such that tubular shell 4 may slide over tubular sheath 1 and be securely placed between first ring 12 and second ring 14. In addition, tubular sheath 1 includes at least two toothed slits 13 (i.e., slits having toothed edges) extending in the direction of the center axis of tubular sheath 1 and perpendicular to the plane of sheath opening 11. The distance between any two toothed slits 13 is preferably the same in either direction along the curved surface of tubular sheath 1. Preferably, tubular sheath 1 also includes at least one sheath interlocking element 15, such as a receiving slot, for engaging and interlocking with actuator 5.

Compressible and expandable reservoir 2 stores the liquid to be dispensed out of the atomizer. As the reservoir neck portion with opening 21 extends out of sheath opening 11, a ring element 25 is securely attached around the neck of reservoir opening portion 21. Ring element 25 has a larger diameter than sheath opening 11 such that reservoir 2 would not drop out of tubular sheath 1 once ring element 25 is attached around the neck of reservoir opening portion 21. Reservoir opening portion 21 engages a dispensing cap 22 preferably by screwing into dispensing cap 22, which includes a dispensing head with orifice 23. The reservoir body 24 is preferably made of accordion-like pleats to enable reservoir 2 to be compressed and expanded.

Preferably, pressurizer 3 includes a spring element 32 inserted into a bottom portion 31 and capped with a top portion 33. Top portion 33 engages bottom portion 31 by engaging at least one connecting element 331, such as a hook, with at least one counter-connecting element 311, such as a receiving hole. Thus, when top portion 33 and bottom portion 31 are engaged, spring element 32 is pressed by top portion 33 downward from a relaxed state into a coiled state. Preferably, counter-connecting element 311 is such that, as top portion 33 and bottom portion 31 remain engaged, top portion 33 can be further pressed against spring element 32 such that spring element 32 can shift between less coiled states and further coiled states. This allows top portion 33 to be spring loaded and able to move up and down relative to bottom portion 31 and within the confines of counter-connecting element 311. As such, an elastic buffer is created against the movement of a pressurized reservoir 2.

To further secure the top and bottom portions 33 and 31 against the spring action, top portion 33 preferably includes an axial protrusion 332 moveably insertable into an axial receiver 312. Preferably, top portion 33 further includes a connecting ring 333 for connecting top portion 33 with the bottom of reservoir 2. Furthermore, bottom portion 31 includes at least two protruding elements 313 each having two teeth for engaging toothed slits 13, and a ridged surface portion 314 for engaging at least one helical groove 41 carved on the inner wall of tubular shell 4, as further discussed below.

As stated above, tubular shell 4 is to be slid over tubular sheath 1 such that it rests between first ring 12 and second ring 14. Tubular shell includes at least one helical groove 41 on its inner wall. Preferably, the number of helical grooves 41 matches the number of protruding elements 313 such that each ridged surface portion 314 respectively engages one helical groove 41 on an imaginary plane parallel to the bottom of reservoir 2. If the number of helical grooves 41 is less than the number of protruding elements 313, the upward rotatability of pressurizer 3 can still be maintained by adjusting the positions of protruding elements 313 relative to the top surface of top portion 33 such that more than one protruding element 313 engage one helical groove 41.

Actuator 5 is preferably a rotatable cap which includes at least one actuator interlocking element 51 for engaging and interlocking with tubular sheath 1 via sheath interlocking element 15. Once interlocked with tubular sheath 1, actuator 5 can be rotated to move pressurizer 3 rotatably upward along toothed slits 13 and that, in turn, compresses reservoir 2 and creates pressure within reservoir 2. Once interlocked with tubular sheath 1, actuator 5 also prevents other components from disassembling.

Figure 4:
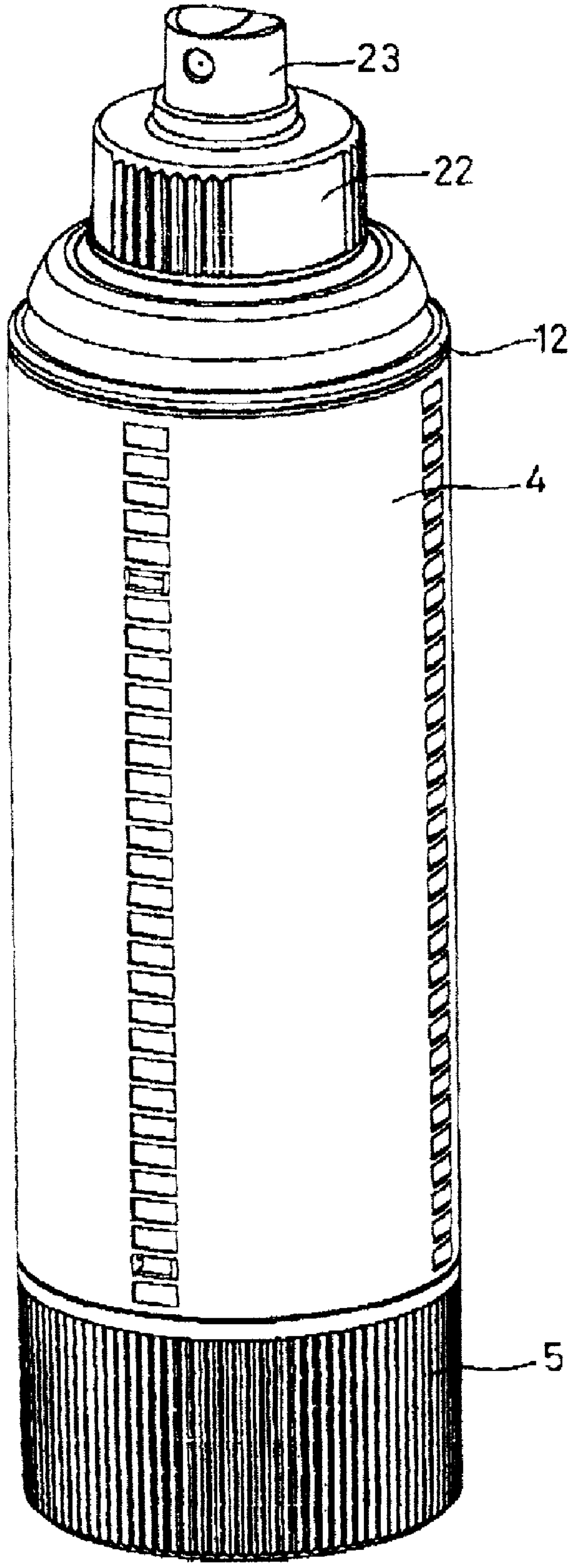
FIG. 4 is a front perspective view of an assembled atomizer of FIG. 1.

A properly assembled atomizer in accordance with the present invention is shown in FIGS. 2 and 4 in cross-sectional and front perspective views, respectively.

Figure 3:
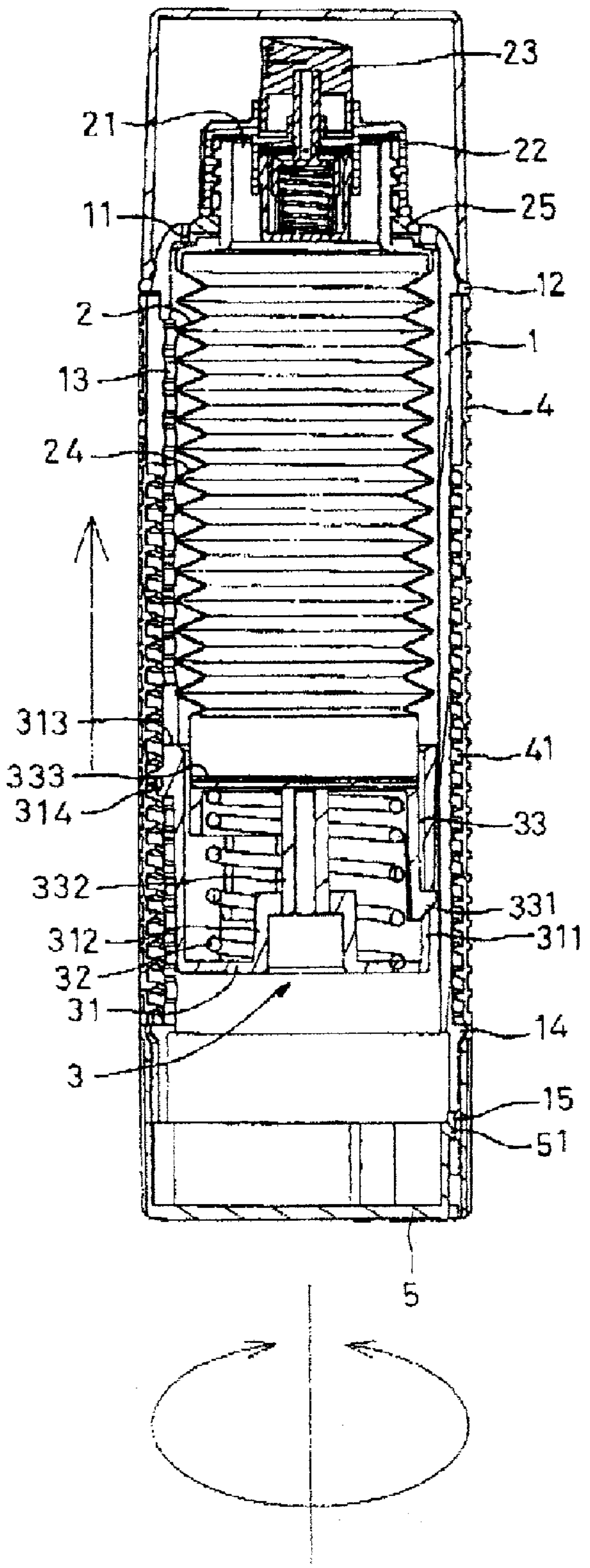
FIG. 3 is a cross-sectional view of the atomizer of FIG. 1 in operation.

Referring now to FIGS. 2 and 3, tubular sheath 1 rotates as actuator 5 is rotated. At the same time, since protruding elements 313 are lodged in toothed slits 13, and ridged surface portions 314 are engaged in helical grooves 41, pressurizer 3 rotates upward as ridged surface portions 314 rotates along the engaged helical grooves 41 and protruding elements 313 moves upward along toothed slits 13. As pressurizer 3 rotates upward, it presses against the bottom of reservoir 2, compressing the volume of reservoir 2 and increasing the pressure inside. Therefore, as dispensing head with orifice 23 is pressed, the liquid inside reservoir 2 is sprayed or flowed out via the orifice due to the internal pressure. Once the pressure disappears, the liquid content would not be dispensed out of the orifice even with repeated pressing of the dispensing head.

Turning now to FIGS. 1, 2 and 4, dispensing cap 22 can be unscrewed off of the reservoir neck portion with opening 21, and reservoir 2 can be refilled. As the atomizer is designed to gain access to most or the entire volume of reservoir 2, no capillary conduits are needed. Similarly, the atomizer is not limited to a specific operating orientation. Thanks to its pressure-actuated design, the atomizer can be used while it is in the upright, horizontal, upside-down, or any other angled positions.

Moreover, the precise volume of a spray can be calculated and controlled. As pressure is increased inside reservoir 2 by rotating actuator 5, the amount of pressure can be controlled by how much actuator 5 is rotated. In turn, the degree of internal pressure increase inside reservoir 2 determines the amount of the liquid content to be dispensed. Thus, in addition to daily usage products such as fragrances, antiperspirants, lotions, and culinary dispensers, etc., the present invention can also be used in pharmaceutical applications.

Although the invention herein has been described with reference to a particular embodiment, it is to be understood that the embodiment is merely illustrative of the principles and application of the present invention. It is therefore to be understood that various modifications may be made to the above mentioned embodiment and that other arrangements may be devised without departing from the spirit and scope of the present invention as defined by the appended claims.

What is claimed is:

1. An atomizer, comprising:

a tubular sheath having at least two slits;

a compressible and expandable reservoir;

a tubular shell having at least one helical groove on its inner wall;

a pressurizer engageable with the tubular sheath and the tubular shell via the at least two slits and the at least one helical groove, respectively;

an actuator; and a first ring and a second ring on the outer surface of the tubular sheath, wherein as the actuator is rotated, the pressurizer compresses the reservoir and increases the internal pressure of the reservoir, and wherein the tubular shell can be slid over the tubular sheath and securely placed between the first and second rings.

2. The atomizer of claim 1, further comprising:

at least one sheath interlocking element near one opening of the tubular sheath; and at least one corresponding actuator interlocking element capable of interlocking the actuator with the tubular sheath via the at least one sheath interlocking element.

3. The atomizer of claim 1, wherein the reservoir is made of accordion-like pleats.

4. The atomizer of claim 1, wherein the pressurizer comprises at least one protruding element each having a ridged surface portion engageable with the at least one helical groove, and wherein the number of the at least one protruding element matches the number of the at least one helical groove.

5. The atomizer of claim 1, a wherein the pressurizer comprises at least one protruding element each having a ridged surface portion engageable with the at least one helical groove, and wherein the number of the at least one protruding element is fewer than the number of the at least one helical groove.

6. An atomizer, comprising:

a tubular sheath having at least two slits;

a compressible and expandable reservoir;

a tubular shell having at least one helical groove on its inner wall;

a pressurizer ennageable with the tubular sheath and the tubular shell via the at least two slits and the at least one helical groove, respectively;

an actuator; and a ring connector for securely connecting the compressible and expandable reservoir with the tubular sheath, wherein as the actuator is rotated, the pressurizer compresses the reservoir and increases the internal pressure of the reservoir.

7. An atomizer, comprising:

a tubular sheath having at least two slits;

a compressible and expandable reservoir;

a tubular shell having at least one helical groove on its inner wall;

a pressurizer engageable with the tubular sheath and the tubular shell via the at least two slits and the at least one helical groove, respectively; and an actuator, wherein as the actuator is rotated, the pressurizer compresses the reservoir and increases the internal pressure of the reservoir, and wherein the pressurizer comprises a top portion, a bottom portion, and a spring element to be placed between the top and bottom portions.

8. The atomizer of claim 7, wherein the pressurizer becomes spring-loaded as the top portion engages the bottom portion, and wherein the bottom portion is engageably moveable relative to the top portion within the confines of the spring-loading action.

9. The atomizer of claim 8, wherein the top portion engages the bottom portion via an interlocking system comprising at least two hooks on the top portion and at least two receiving slots on the bottom portion.

10. The atomizer of claim 7, wherein the top portion engages the bottom portion via a connecting mechanism comprising an axial protrusion on the top portion and an axial receiver on the bottom portion, and wherein the axial protrusion is insertable into the axial receiver.

* * * * *